United States Patent [19]

Ashkin et al.

[11] Patent Number: 4,529,262

[45] Date of Patent: Jul. 16, 1985

[54] INLINE OPTICAL FIBER ATTENTUATOR

[75] Inventors: Arthur Ashkin, Rumson; Joseph M. Dziedzic, Clark; Jay R. Simpson, Fanwood; Rogers H. Stolen, Rumson all of N.J.

[73] Assignee: AT&T Bell Laboratories, Murray Hill, N.J.

[21] Appl. No.: 492,817

[22] Filed: May 9, 1983

[51] Int. Cl.³ .............................................. G02B 5/172
[52] U.S. Cl. ................................ 350/96.15; 350/96.29
[58] Field of Search .................. 350/96.15, 96.2, 96.21, 350/96.29, 96.30, 96.22

[56] References Cited

U.S. PATENT DOCUMENTS

| 4,145,110 | 3/1979 | Szentesi | 350/96.15 |
| 4,176,908 | 12/1979 | Wagner | 350/96.15 |
| 4,257,707 | 3/1981 | Liertz et al. | 356/73.1 |
| 4,261,640 | 4/1981 | Stankos et al. | 350/96.15 |
| 4,281,925 | 8/1981 | Forrest et al. | 356/73.1 |
| 4,304,489 | 12/1981 | Wakabayashi et al. | 356/73.1 |

OTHER PUBLICATIONS

*Optics Letters*, vol. 8, No. 12, Dec. 1983, p. 647, Tension-Adjusted In-line Optical-Fiber Attenuator, Dziedzic, Ashkin, Stolen, Simpson.

*Optics Letters*, vol. 6, No. 4, Apr. 1981, p. 204, Temperature Sensing by Mode-Mode Interference in Birefringent Optical Fibers.

"The Birefringent Filter", *Journal of the Optical Society of America*, vol. 39, No. 3, Mar. 1949, J. W. Evans, pp. 229-242, 412.

"Optical Fiber Drawing . . . ", *Transactions of the IECE of Japan*, vol. E61, No. 3, Mar. 1978, K. Yoshida et al., pp. 181-184.

"Origin of Temperature Dependence . . . ", *Optical Fiber Communication*, 1979, E. G. Hanson, TUE5, pp. 28-31.

*Primary Examiner*—William L. Sikes
*Assistant Examiner*—L. Rushin
*Attorney, Agent, or Firm*—Wendy W. Koba

[57] ABSTRACT

An inline single-mode fiber attenuator (10) is disclosed which may be formed by a tandem combination of a birefringent polarization-preserving fiber (12) and a single polarization fiber (14). The birefringent fiber functions as a variable wave plate and the single polarization fiber functions as a fiber polarizer. By continuously changing the local birefringence of the birefringent fiber with, for example, tension, pressure, or temperature, the phase difference between the two polarization components of light traveling through the birefringent fiber is continuously modified. The difference in phase causes suppression of one of the polarization components as it enters the fiber polarizer and, therefore, the output of the fiber polarizer, the sum of the two polarizations, is attenuated. The attenuator may be tuned by changing the local birefringence of the birefringent fiber. An inline optical fiber bandpass filter may be formed by cascading a plurality of appropriately arranged inline fiber attenuators formed in accordance with the present invention.

16 Claims, 5 Drawing Figures ically adjusted for the varying
INLINE OPTICAL FIBER ATTENUATOR

BACKGROUND OF THE INVENTION

1. Field of the Invention

The present invention relates to an inline optical fiber attenuator and, more particularly, to an inline optical fiber attenuator formed with only two fiber components, a birefringent polarization-preserving fiber and a single-polarization fiber, where the degree of attenuation is adjusted merely by changing the birefringence in the polarization-preserving fiber.

2. Description of the Prior Art

Optical fiber attenuators find a wide variety of uses and will become more prevalent as more and more electrical communication systems are replaced with optical fiber communication systems. For example, fiber attenuators are utilized in testing manufactured optical fiber cable, comparing signals propagating along various fibers. In the laboratory environment, attenuators may be employed in experimental apparatus to control, for example, a laser beam intensity where a predetermined intensity is so required. Further, optical fiber attenuators may be utilized with a feedback control system to stabilize the output therefrom, correcting for coupling losses and drift in the output beam, thus stabilizing the intensity of the output beam.

One prior art attenuation arrangement is disclosed in U.S. Pat. No. 4,261,640 issued to W. C. Stankos et al. on Apr. 14, 1981 which relates to an inline optic attenuator comprising a light absorbing optical disc and two fiber sections, where the entire amount of desired attenuation is accomplished by exposing the photographic film forming the optical disc to a degree sufficient to equal the desired attenuation of the simulated length of optical fiber. In operation, the disc must be quite thin since the light beam will tend to disperse in the disc as it passes between the ends of the fibers attached thereto. If the dispersion is great enough, it will cause multiple path lengths and possibly multimode pickup in the receiving optic fiber, thereby creating pulse distortion in the optical path.

An alternative prior art arrangement is disclosed in U.S. Pat. No. 4,257,671 issued to A. Barbaudy et al. on Mar. 24, 1981. In this arrangement, the attenuator comprises an attenuator element and two plane, graded index lenses in alignment with each other and separated by the attenuator element. The attenuator element is formed of an organic or inorganic medium which is transparent to the wavelength of the light rays and which is doped with one or more substances which have an absorption band at the wavelength employed. The use of the graded index lenses eliminates many of the spurious reflections associated with other prior art arrangements.

An optical fiber connector which may be employed as an inline attenuator is disclosed in U.S. Pat. No. 4,145,110 issued to O. Szentesi on Mar. 20, 1979. Here, the attenuator comprises a connecting element with a common bore of size to accept with close sliding fit two optical fibers in an end-to-end relationship. Generally, one fiber is permanently held in the connecting member, as by crimping or bonding, and the other fiber is moved by a linear positioner which moves the fiber back and forth axially to increase and decrease the end separation of the two fibers, thus increasing and decreasing the attenuation. Such an arrangement, however, is of limited ability in fine-tuning the attenuation in association with the mechanical nature of the adjustment procedure and is extremely sensitive to small separations, on the order of a few wavelengths.

There remains a need in the field of optical fiber attenuators, however, for an inline optical fiber attenuator which is completely contained within the fiber itself, that is, requiring no external bulk components, and which is capable of being easily adjusted for the varying amounts of attenuation desired.

SUMMARY OF THE INVENTION

The problem remaining in the prior art has been solved in accordance with the present invention which relates to an inline optical fiber attenuator and, more particularly, to an inline optical fiber attenuator formed with only two fiber components, a birefringent polarization-preserving fiber and a single-polarization fiber, where the degree of attenuation is adjusted merely by changing the birefringence in the polarization-preserving fiber.

It is an aspect of the present invention to provide an inline attenuator which is capable of being continuously adjusted. In accordance with the present invention, the birefringent polarization-preserving fiber acts as a variable wave plate and the single-polarization fiber acts as a polarizer. The state of birefringence in the birefringent fiber section is easily adjusted, for example, with tension (pulling the fiber in the direction of its length), pressure (uniform hydrostatic or squeezing a portion of the fiber) or heating a localized portion of the fiber section.

Another aspect of the present invention is to utilize the properties inherent in the single-mode, polarization-preserving fiber. Optical power can be delivered from a source to any desired location with low loss, mode filtering properties, and essentially no beam deviation. The output is linearly polarized and can be set to any desired angle. The fiber attenuator thus performs simultaneously the functions of many different discrete optical components.

Yet another aspect of the present invention is to provide an inline Lyot filter constructed by cascading a plurality of attenuators formed in accordance with the present invention, where the bandpass characteristic of the Lyot filter is tunable by adjusting the birefringence of each stage of the filter.

Other and further aspects of the present invention will become apparent during the course of the following description and by reference to the accompanying drawings.

BRIEF DESCRIPTION OF THE DRAWINGS

Referring now to the drawings, where like numerals represent like parts in several views.

DETAILED DESCRIPTION

Figure 1:
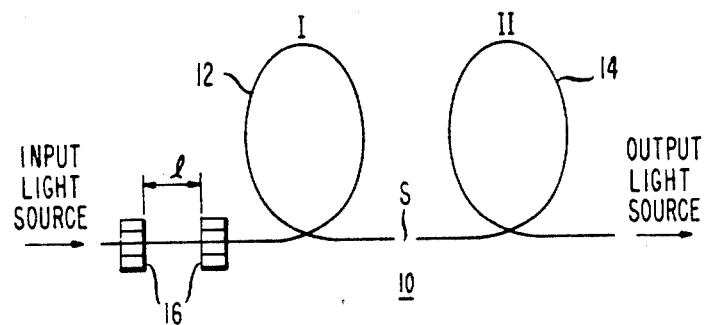
FIG. 1 illustrates an exemplary inline optical fiber attenuator formed in accordance with the present invention.

The basic arrangement of an exemplary inline optical fiber attenuator 10 formed in accordance with the present invention is illustrated in FIG. 1. Attenuator 10 comprises two separate sections of optical fiber, a birefringent polarization-preserving fiber 12 and a single-polarization fiber 14, where birefringent fiber section 12 functions as a variable wave plate and single-polarization fiber 14 functions as a fiber polarizer. The light wave to be attenuated is applied as an input to birefringent section 12, passes through birefringent section 12 and subsequently through single-polarization fiber 14, where sections 12 and 14 are spliced together at point S illustrated in FIG. 1. As shown, an input light beam is applied to fiber section 12 and the attenuated output appears at the far end of single-polarization fiber 14. In accordance with the present invention, a birefringence modifying means 16 is disposed in contact with birefringent fiber section 12 and functions to change the birefringence of fiber section 12 from that inherent in the drawn fiber to a predetermined amount necessary to obtain the desired amount of attenuation at the exit of fiber section 14.

Figure 2:
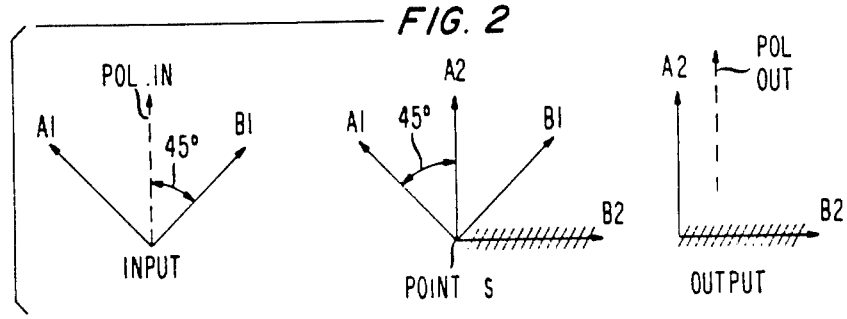
FIG. 2 contains a phase diagram of the operation of the exemplary inline optical fiber attenuator illustrated in FIG. 1.

A phase diagram illustrating the operation of fiber attenuator 10 is illustrated in FIG. 2. In operation of attenuator 10, birefringent fiber section 12 is fed at the input with laser light linearly polarized at, for example, 45 degrees to the principal polarization axes A1 and B1, illustrated in FIG. 2, thus equally exciting the two orthogonal modes. It is to be understood that the input laser light may comprise any state of polarization with equal components along the principal axes. In the practice of the present invention, the state of polarization at the output of fiber section 12 is continuously changed by adjusting the birefringence in fiber section 12. Single-polarization fiber section 14 is spliced to birefringent fiber section 12 at point S with its principal polarization axes, denoted A2 and B2, rotated 45 degrees to those of birefringent fiber section 12. The 45 degree of rotation at splice S allows for a maximum transmitted signal and also maximum attenuation to be obtained, but is not essential to the practice of the present invention, since any rotation at splice S will still allow a variable attenuator to be constructed which varies in relation to the birefringence present in fiber section 12. For angles of rotation other than 45 degrees, maximum transmission may still be obtained, but maximum attenuation will not, and vice versa. Single-polarization fiber section 14 has the property that it will guide light polarized along only one axis, A2; the orthogonal polarization (B2) is lost by tunneling. A complete description of the operation and properties of a single-polarization, single-mode fiber is contained in Ser. No. 464,059 assigned to like assignee of the present invention and filed on Feb. 4, 1983. In the present invention, when the magnitude of the birefringence of fiber section 12 is continuously varied by birefringence modifying means 16, a continuously variable phase shift will be introduced between the two axes of the input light wave.

The introduction of a variable phase shift in birefringent fiber section 12 by birefringence modifying means 16 causes the state of polarization at splice S to also vary, passing as the birefringence is continuously changed, from linear along the guiding axis of single-polarization fiber section 14 to elliptical, to circular, to elliptical along the attenuating axis and to linear along the attenuating axis. As the birefringence is continued to change, the state of polarization will pass to elliptical along the attenuating axis, to circular, to elliptical along the guiding axis, and finally back to linear along the guiding axis of single-polarization fiber section 14. Therefore, birefringence modifying means 16, in accordance with the present invention, is capable of introducing every state of polarization at splice S.

Figure 3:
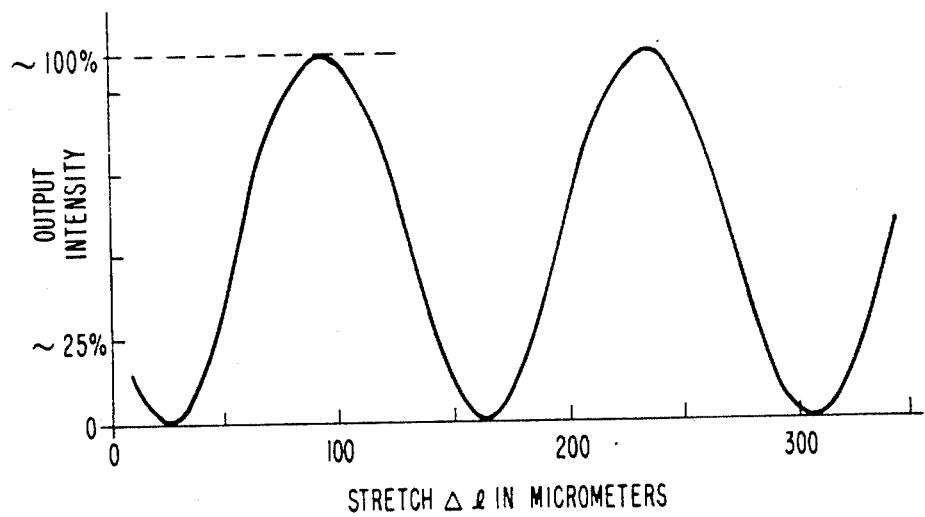
FIG. 3 illustrates the measured output intensity as a function of the change in birefringence for an exemplary embodiment of the present invention where the change in birefringence is caused by stretching a section of birefringent fiber.

Birefringence modifying means 16 may comprise any arrangement capable of changing the magnitude of the birefringence in a portion of birefringent fiber section 12. For example, means 16 may comprise a device for introducing tension in birefringent fiber section 12, one arrangement being a stretching device comprising a pair of plates whose separation l, as illustrated in FIG. 1, is micrometer driven. FIG. 3 illustrates the measured output of a one meter section of single-polarization fiber 14 as a 10 centimeter length l of an 80 centimeter section of birefringent fiber 12 having a beat length of approximately 0.2 cm is axially stretched by an amount $\Delta l$ in micrometers. Beat length of a fiber is defined as that length which gives a phase difference of $2\pi$ (360 degrees) between waves propagating along the principal axes. The difference between maximum and minimum transmission, as illustrated in FIG. 3, is approximately 30 dB. In one exemplary arrangement, the insertion loss was 1.3 dB which was mostly coupling loss at the input of birefringent fiber section 12.

The output power may also be feedback-stabilized by using an appropriate power sensor and a feedback control circuit, controlling for example, a piezoelectric driven micrometer lengthening means 16 to stretch birefringent fiber 12.

Instead of fiber lengthening apparatus, birefringence modifying means 16 may comprise a temperature regulated heating unit, since the birefringence of fiber section 12 is also a function of temperature. For example, an increase in temperature of approximately 15 degrees K. will cause a phase change of 360 degrees at the output of fiber section 12. Additionally, birefringence modifying means may comprise pressure-inducing apparatus which functions to "squeeze" a portion of birefringent fiber section 12, along either of the two principle axes of fiber section 12 thereby changing the magnitude of the local birefringence. For example, a force of 10 Newtons applied to a 10 cm length of fiber section 12 with a typical diameter of 100 micrometers will produce a phase change of 360 degrees between waves propagating along the principal axes. Also, uniformly applied hydrostatic pressure may be utilized to change the magnitude of the local birefringence of fiber section 12.

In its simplest form, attenuator 10 has many advantages over prior art bulk components. The attenuation can be varied with virtually no beam wander and fibers formed in accordance with the present invention have been found to withstand many watts of cw argon laser power. An attenuator formed in accordance with the present invention can be easily and reproducibly varied, since as seen in FIG. 3, it requires approximately 150 micrometers of stretch of a 10 cm length of fiber to change through all the possible states of polarization.

It is to be understood that the above-described procedure may also be used in reverse. That is, since the output attenuation of a device formed in accordance with the present invention varies continuously in proportion to the amount of additional birefringence introduced in fiber section 12, an optical attenuator may also be used as an inline optical fiber sensor. In particular, a device formed in accordance with the present invention may be used to sense tension, pressure, temperature, or any other means for changing the birefringence in fiber section 12, by measuring both the output and input light intensities.

Figure 4:
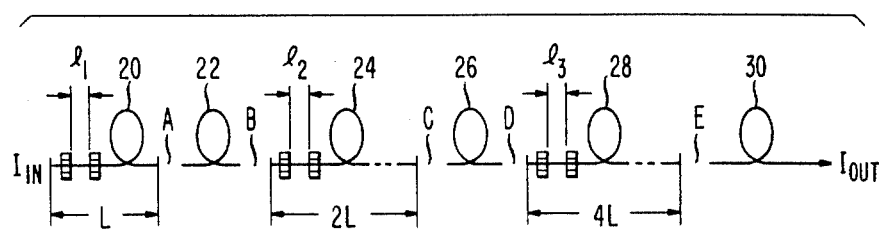
FIG. 4 illustrates an exemplary three-stage inline Lyot bandpass filter formed in accordance with the present invention.
Figure 5:
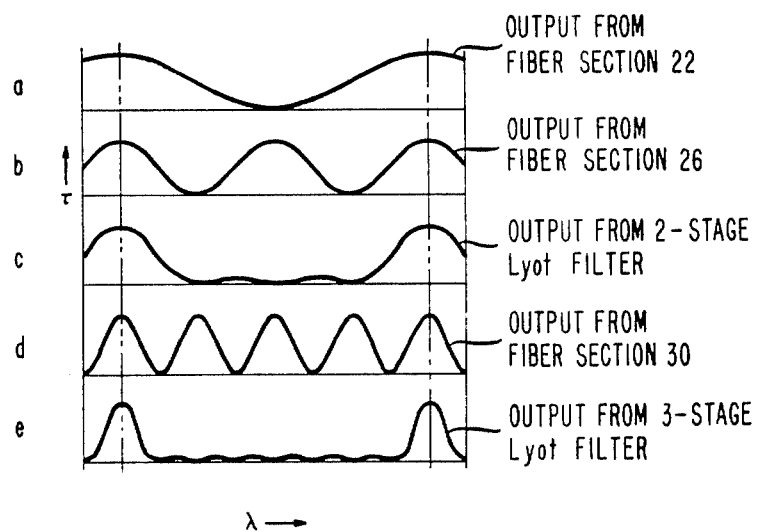
FIG. 5 illustrates a set of transmission curves for the arrangement illustrated in FIG. 4.

In an alternative use of the present invention, an attenuator 10 may also be employed as one stage of a Lyot filter, where by alternating appropriate lengths of polarization preserving fiber with sections of fiber polarizer, a tunable bandpass filter may be formed which is tunable by any of the birefringence modifying methods discussed hereinabove in accordance with the present invention. An exemplary three stage Lyot filter formed with three separate inline optical fiber attenuators formed in accordance with the present invention is illustrated in FIG. 4. The first stage of the filter comprises a birefringent fiber section 20 of length L and a fiber polarizer section 22, where the two fiber sections are joined at a splice A. In the Lyot filter implementation, the fibers to operate properly should have their respective axes of polarization rotated 45 degrees at splice A. The output appearing at the end of fiber section 22 is illustrated in FIG. 5, which illustrates output transmission as a function of wavelength.

A second stage of the Lyot filter is formed with a birefringent fiber section 24 of length 2L and a fiber polarizer section 26. Fiber section 24 is joined to the output of fiber polarizer section 22 at a splice B and fiber polarizer section 26 is joined to birefringent fiber section 24 at a splice C. In accordance with the operation of a Lyot filter, the length of fiber section 24 must be twice that of fiber section 20, where in general form, the length of a given stage is defined empirically by the equation $$L_N = 2^{N-1} L_1, \text{ where } N = 1, 2, \ldots \quad (1)$$

Further, the state of polarization which exists at splice B must be identical with that existing at point A, therefore, the axes of polarizations for birefringent fiber sections 20 and 24 must be parallel. Also, the axes of polarization of fiber section 26 should be rotated 45 degrees with respect to those of fiber section 24 at splice B in order for the filter to operate most efficiently. The output of the second stage of the Lyot filter is also illustrated in FIG. 5. Curve (c) in FIG. 5 illustrates the output waveform for a two-stage Lyot filter formed as described above.

A third stage of the Lyot filter is formed with a birefringent fiber section 28 and a fiber polarizer section 30. In accordance with equation (1), fiber section 28, which is joined to fiber polarizer section 26 at a splice D, must comprise a length 4L and must also have its axes of polarization parallel with those of birefringent fiber sections 20 and 24. Fiber polarizer section 30 is joined to fiber section 28 at a splice E, where its axes of polarization are rotated 45 degrees from the axes of polarization of fiber section 28. The transmission characteristic of the third stage of the Lyot filter is illustrated in FIG. 5(d).

In accordance with the operation of the Lyot filter, the wavelength appearing at the output of the third stage will be the only wavelength capable of being passed by all three sections of the filter. This can be seen by reference to FIG. 5(e), where the bottom curve represents the output characteristic of a three stage Lyot filter formed with the components described above. The wavelength which is passed by all three stages can be modified, in accordance with the present invention, by changing the birefringence of each of the birefringent fiber sections 20, 24 and 28. It is to be noted that for the Lyot filter to operate properly, the birefringence in each fiber section must be changed by the same amount, that is, the same state of polarization must exist at splices A, C, and E so that the same wavelength is passed by all three stages.

What is claimed is:

1. An inline optical fiber attenuator for receiving an input light wave and producing as an output an attenuated version thereof, said inline optical fiber attenuator comprising a first optical fiber section including a first and a second endface, said first optical fiber section formed from a birefringent optical fiber having a set of predetermined principal polarization axes and a known birefringence, a second optical fiber section including a first and a second endface, said second optical fiber section formed from a single-polarization optical fiber having a set of predetermined principal polarization axes, said first endface of said second fiber section coupled to said second endface of said first optical fiber section for providing transmission of an input light wave through said second fiber section; and birefringence modifying means for modifying said known birefringence of said first fiber section whereby an input light wave passing through said optical first and second fiber sections would be attenuated in relation to said modification of said birefringence.

2. An inline optical fiber attenuator formed in accordance with claim 1 wherein the second fiber section is coupled to the first fiber section such that there exists a predetermined degree of rotation between the set of principal polarization axes of said first fiber section and the set of principal polarization axes of said second fiber section.

3. An inline optical fiber attenuator formed in accordance with claim 2 wherein there exists a rotation of forty-five degrees between the set of principal polarization axes of the first fiber section and the set of principal polarization axes of the second fiber section.

4. An inline optical fiber attenuator formed in accordance with claim 1 wherein the birefringence modifying means comprises a stretching means for applying a tension along a longitudinal axis of the first fiber section thereby changing the magnitude of the birefringence of the input light wave and forming as an output a pair of modified polarization components of said input light wave.

5. An inline optical fiber attenuator formed in accordance with claim 1 wherein the birefringence modifying means comprises a pressure applying means for changing the birefringence in a portion of the first fiber section.

6. An inline optical fiber attenuator formed in accordance with claim 5 wherein the pressure applying means comprises means for squeezing a portion of the first fiber section along one of the principal polarization axes of said first fiber section.

7. An inline optical fiber attenuator formed in accordance with claim 5 wherein the pressure applying means comprises means for uniformly applying hydrostatic pressure to the first fiber section.

8. An inline optical fiber attenuator formed in accordance with claim 1 wherein the birefringence modifying means comprises a heat applying means to control the temperature of the first fiber section.

9. An inline optical bandpass filter for receiving an input light wave and producing as an output a filtered version thereof, said bandpass filter comprising a plurality of N stages formed from a plurality of N cascaded optical fiber attenuators, each optical attenuator comprising a first optical fiber section including a first and a second endface, said first optical fiber section formed from a birefringent optical fiber having a set of predetermined polarization axes and a known birefringence;

a second optical fiber section including a first and a second endface, said second optical fiber section formed from a single-polarization fiber having a set of predetermined polarization axes and coupled to said second endface of said first optical fiber section; and birefringence modifying means for modifying said known birefringence whereby a light wave passing through both said first and second optical fiber sections would be attenuated as a function of the modification of the birefringence.

10. An inline optical fiber bandpass filter formed in accordance with claim 9 wherein the plurality of N cascaded optical fiber attenuators are formed such that the fiber length of the first fiber section of each stage is determined in accordance with the equation $L_N = 2^{N-1} L_o$ where $L_o$ is defined as the length of said first fiber section of the first stage of the inline optical fiber bandpass filter.

11. An inline optical fiber bandpass filter formed in accordance with claim 9 wherein each second fiber section is coupled to its associated first fiber section such that there exists a forty-five degree rotation between a set of principal polarization axes of the first fiber section and a set of principal polarization axes of the second fiber section.

12. An inline optical fiber bandpass filter formed in accordance with claim 9 wherein at least one birefringence modifying means comprises a stretching means for applying a tension along a longitudinal axis of the associated first fiber section.

13. An inline optical fiber bandpass filter formed in accordance with claim 9 wherein at least one birefringence modifying means comprises a pressure applying means for changing the birefringence in a portion of the associated first fiber section.

14. An inline optical fiber bandpass filter formed in accordance with claim 13 wherein the pressure applying means comprises means for squeezing a portion of the first fiber section along one of the principal polarization axes of said first fiber section.

15. An inline optical fiber bandpass filter formed in accordance with claim 13 wherein the pressure applying means comprises means for uniformly applying hydrostatic pressure to the first fiber section.

16. An inline optical fiber bandpass filter formed in accordance with claim 9 wherein at least one birefringence modifying means comprises a heat applying means to control the temperature of the first fiber section.

* * * * *